US006408218B1

(12) United States Patent
Hallahan et al.

(10) Patent No.: US 6,408,218 B1
(45) Date of Patent: Jun. 18, 2002

(54) SHOP FLOOR CONTROL SYSTEM

(75) Inventors: Francis W. Hallahan, Everett; Thomas M. Olson, Peabody, both of MA (US)

(73) Assignee: Textron Systems Corporation, Wilmington, DE (US)

( * ) Notice: Subject to any disclaimer, the term of this patent is extended or adjusted under 35 U.S.C. 154(b) by 0 days.

(21) Appl. No.: 09/271,668

(22) Filed: Mar. 18, 1999

(51) Int. Cl.$^7$ .......................... G06F 19/00; G09B 19/18; G09B 25/00; B42F 21/00

(52) U.S. Cl. ...................... 700/102; 700/106; 434/108; 434/407; 40/360; 40/374

(58) Field of Search .................. 700/99–102, 115–116, 700/219, 221–222, 229–230, 228; 29/701; 434/108, 219, 222–224, 369, 407, 238; 40/360, 374, 625; 283/36, 37, 39

(56) References Cited

U.S. PATENT DOCUMENTS

| | | | | |
|---|---|---|---|---|
| 3,478,719 A | * | 11/1969 | Sadoff ........................ 116/135 |
| 3,571,949 A | * | 3/1971 | Gormley ........................ 35/24 |
| 3,780,695 A | * | 12/1973 | Richard ...................... 116/136 |
| 3,845,286 A | | 10/1974 | Aronstein et al. ........ 235/151.1 |
| 3,862,615 A | * | 1/1975 | Liou ........................... 116/135 |
| 4,019,027 A | | 4/1977 | Kelley ...................... 235/89 R |
| 4,459,663 A | | 7/1984 | Dye ........................... 364/200 |
| 4,472,783 A | | 9/1984 | Johnstone et al. .......... 364/474 |
| 4,646,238 A | | 2/1987 | Carlson, Jr. et al. ........ 364/403 |
| 4,646,245 A | | 2/1987 | Prodel et al. ............... 364/468 |
| 4,845,843 A | | 7/1989 | Babcock ........................ 29/829 |
| 4,894,908 A | * | 1/1990 | Haba, Jr. et al. .............. 29/711 |
| 4,896,269 A | | 1/1990 | Tong ........................... 364/468 |
| 4,937,743 A | | 6/1990 | Rassman et al. ............ 364/401 |
| 4,958,292 A | | 9/1990 | Kaneko et al. ............. 364/468 |
| 5,093,794 A | | 3/1992 | Howie et al. ............... 364/468 |
| 5,161,929 A | * | 11/1992 | Lichti, Sr. et al. ....... 414/331.04 |
| 5,204,821 A | | 4/1993 | Inui et al. .................... 364/468 |
| 5,240,746 A | | 8/1993 | O'Connell Litteral ....... 427/510 |
| 5,241,482 A | | 8/1993 | Iida et al. .................... 364/468 |
| 5,304,066 A | * | 4/1994 | Sontag ........................ 434/219 |
| 5,412,576 A | * | 5/1995 | Hansen ....................... 364/468 |
| 5,443,387 A | * | 8/1995 | Mortemard de Boisse .. 434/108 |
| 5,479,343 A | | 12/1995 | Matoba et al. .............. 364/401 |
| 5,612,886 A | | 3/1997 | Weng .................... 364/468.07 |
| 5,751,580 A | | 5/1998 | Chi ........................ 364/468.07 |
| 5,787,000 A | | 7/1998 | Lilly et al. ............. 364/468.01 |
| 5,835,898 A | | 11/1998 | Borg et al. ..................... 705/8 |
| 5,860,810 A | * | 1/1999 | Faul ............................ 434/219 |

* cited by examiner

*Primary Examiner*—Leo Picard
*Assistant Examiner*—Elliot Frank
(74) *Attorney, Agent, or Firm*—Hamilton, Brook, Smith and Reynolds, P.C.

(57) ABSTRACT

An apparatus for monitoring the assembling, testing, and inspection of a product is provided comprising a plurality of kits, wherein each kit contains a plurality of parts to be assembled together to form a product. The apparatus further comprises a plurality of cue cards with each card having a status indicator corresponding to the assembly progress of a particular kit. A display device is further provided to visually display the plurality of cue cards. The status indicator of each cue card can indicate to load the parts into the kits, that the parts are ready to be assembled, that the parts are being assembled, and that the parts in the kit are assembled. A movable indicator, such as a pin, is movable between the status positions to visually indicate the same. The cue card further includes a priority level indicator that corresponds to the priority level of a particular kit. The priority level indicator can include a pin slidable within a slot in the cue card positionable within five different positions which correspond to a high priority (first position) to a low priority (fifth position). The cue card further includes a visual work indicator, for example, a colored strip of material. This indicator can indicate that the kit is overdue or the kit is ready to begin assembly. The cue card further includes a piece part and assembly number and a description of the same.

37 Claims, 4 Drawing Sheets

SHOP FLOOR CONTROL SYSTEM

BACKGROUND OF THE INVENTION

In a typical assembly process, a number of different component parts are assembled and tested in various stages at different work stations. For complex products which may contain thousands of pieces, it can become exceptionally difficult to monitor the work flow process during the several assembly stages. Additionally, different products and even different assembly steps may have different levels of priority for completion. Further, the shop floor supervisor must ensure that the different sub-assemblies which make up a final product arrive at the proper work station at a specific time and that such sub-assemblies have gone through all required stages.

Prior art systems have attempted to monitor the assembly process through complex computer systems. Two exemplary systems are disclosed in U.S. Pat. No. 5,835,898 to Borg et al. and U.S. Pat. No. 5,787,000 to Lilly et al. Each of these systems includes complicated and thus expensive programming instructions. Additionally, the shop floor supervisor must have the necessary computer skills to run the program.

Other prior art systems have provided complex automated systems, as disclosed in U.S. Pat. No. 4,472,783 to Johnstone et al. Johnstone et al. discloses a supervisory control computer system which supervises a plurality of numerically controlled machine tools positioned about the perimeter of a track which carries pallet-carrying transporters. The supervisory control computer system also supervises the transporters to initiate movement of a transporter to a machine tool. It is readily apparent that such a system is highly expensive to both build and maintain and requires a shop floor supervisor skilled in computer systems.

SUMMARY OF THE INVENTION

Thus, a need exists to accurately and inexpensively monitor the simultaneous assembly and testing of different products.

Accordingly, it is an object of the present invention to provide an apparatus that allows a system operator to efficiently monitor the simultaneous assembly, testing, and final inspection of products.

In accordance with the present invention, an apparatus that monitors the assembling of a product is provided which includes a plurality of kits, wherein each kit contains a plurality of parts to be assembled together to form a product. The apparatus further includes a plurality of cue cards with each card having a status indicator corresponding to the assembly progress of a particular kit. A display device is further provided to visually display the plurality of cue cards.

The status indicator of each cue card can indicate to load the parts into the kits, that the parts are ready to be assembled, that the parts are being assembled, and that the parts in the kit are assembled. A movable indicator, such as a pin, is movable between the status positions to visually indicate the same. The cue card further includes a priority level indicator that corresponds to the priority level of a particular kit. The priority level indicator can include a pin slidable within a slot in the cue card positionable within five different positions which correspond to a high priority (first position) to a low priority (fifth position).

The cue card further includes a visual work indicator, for example, a colored strip of material. This indicator can indicate that the kit is overdue or the kit is ready to begin assembly. The cue card further includes a piece part and assembly number and a description of the same.

Preferably, the kits are assembled at various work stations positioned on a shop floor. Each work station includes a visual indicator, such as a colored sign, and the cue card includes a work station indicator, such as a strip of colored material the same color as the sign.

According to a further aspect of the present invention, the display device is organized such that cue cards are positioned in rows corresponding to a particular work station.

According to yet another aspect of the present invention, a cue card corresponding to the cue card visually displayed on display device is removably fastened to the kit positioned at each work station.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
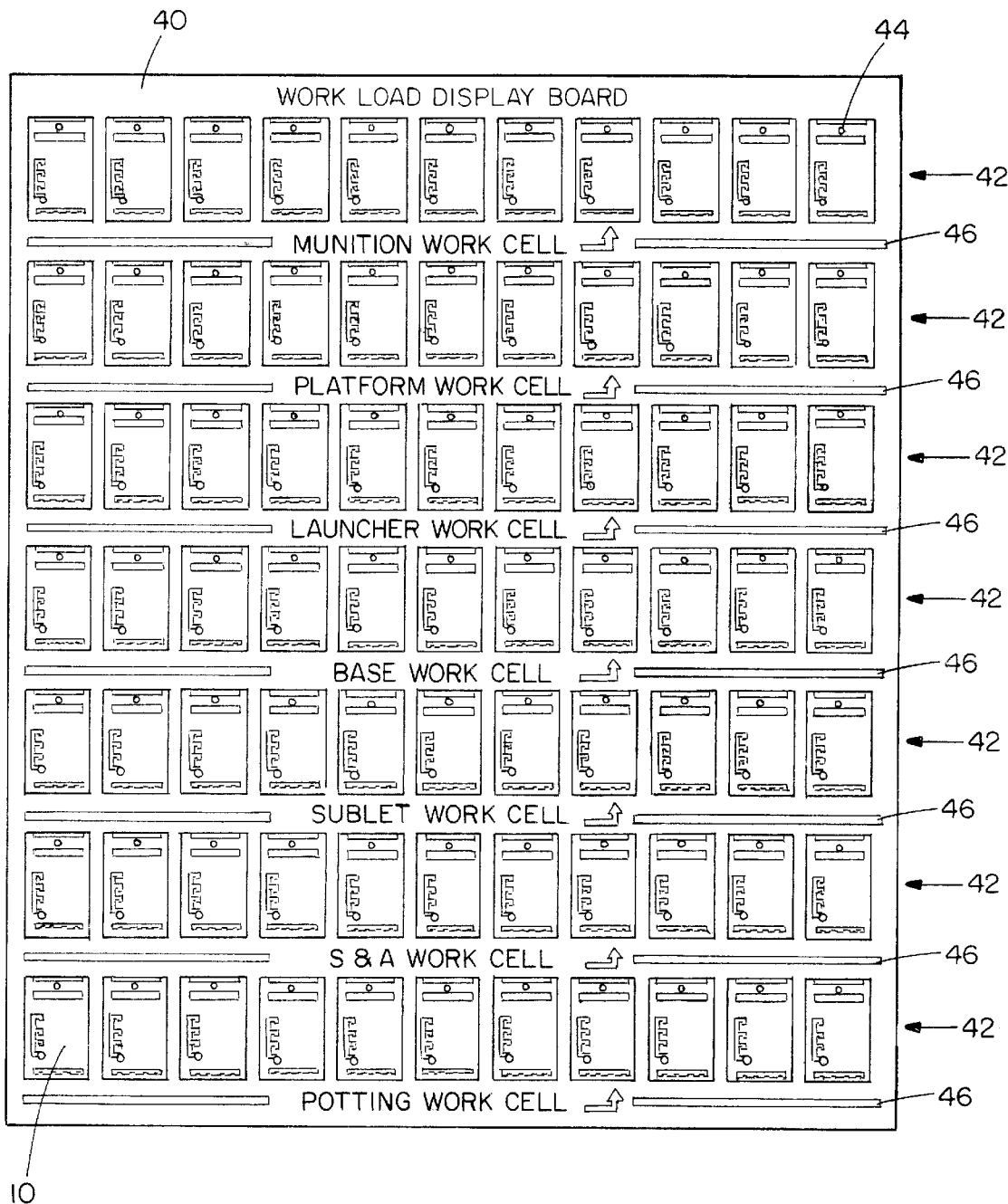
FIG. 1 illustrates a work display board that is provided in accordance with the present invention.

Turning to FIG. 1, an apparatus for monitoring the assembly, testing, and inspection of a plurality of products is shown. More specifically, a workload display board, also referred to as a display device 40, is preferably displayed in a central location on a shop floor which is visible to a system operator and the assemblers and testers. A plurality of visual cue cards 10, each of which correspond to a part or a sub-assembly of a product, are visibly displayed on the display device 40. In accordance with the present invention, a plurality of kits are also provided, each kit typically comprising a box or container for storing and moving the component parts and/or a sub-assembly among the different workstations.

As shown in FIG. 1, the display device 40 is organized into different cells 42, also referred to as workstations, such that a particular kit can be easily found by the location of the cue card 10 on the display device. More specifically, a visual cue indicator 46, which may comprise a colored strip, organizes the display device 40 into the different cells 42. Display device 40 includes a plurality of hooks 44 or other suitable mechanisms for holding cue cards 10 thereto.

Figure 2:
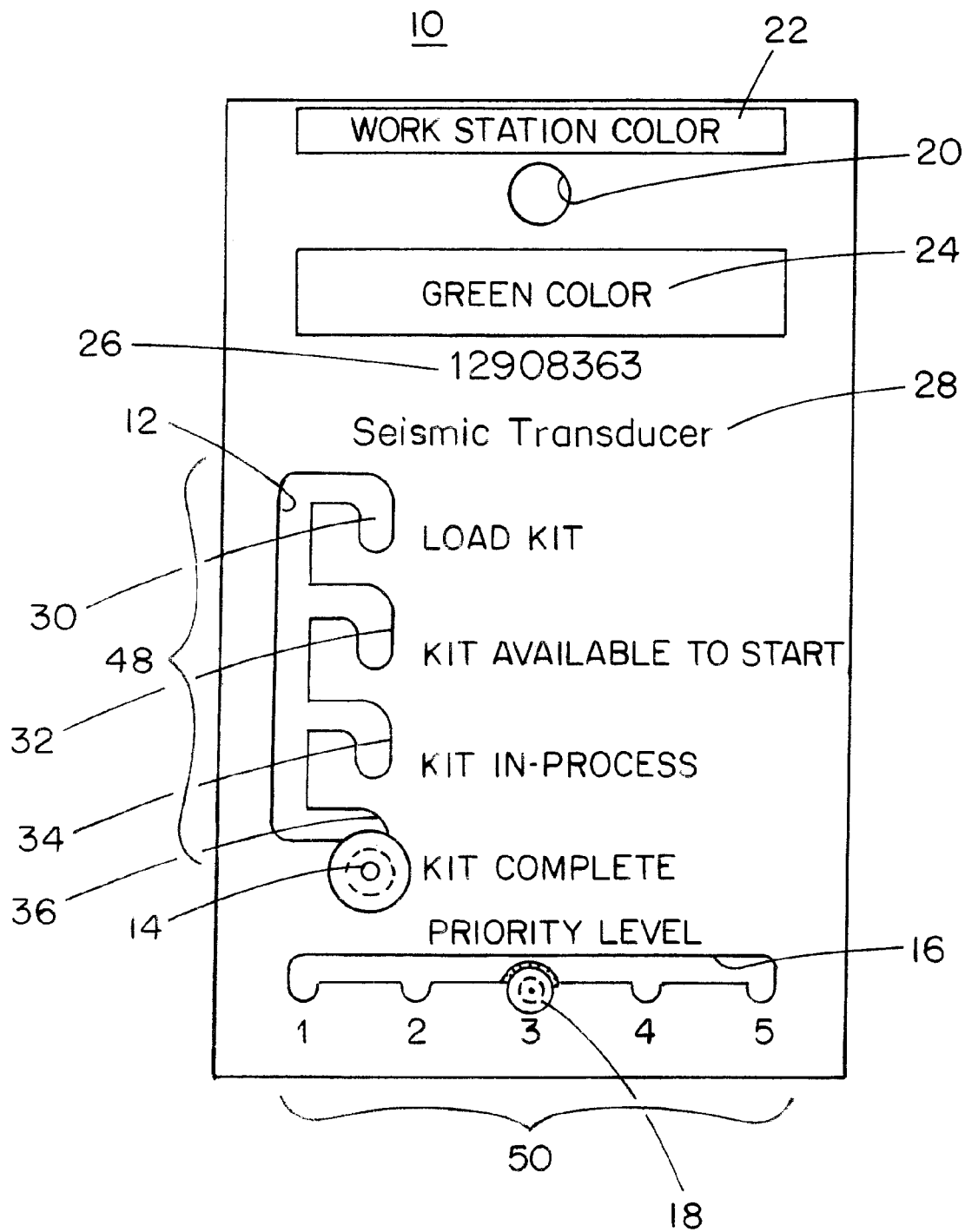
FIGS. 2 and 3 illustrate the features of the cue card shown in FIG. 1.
Figure 3:
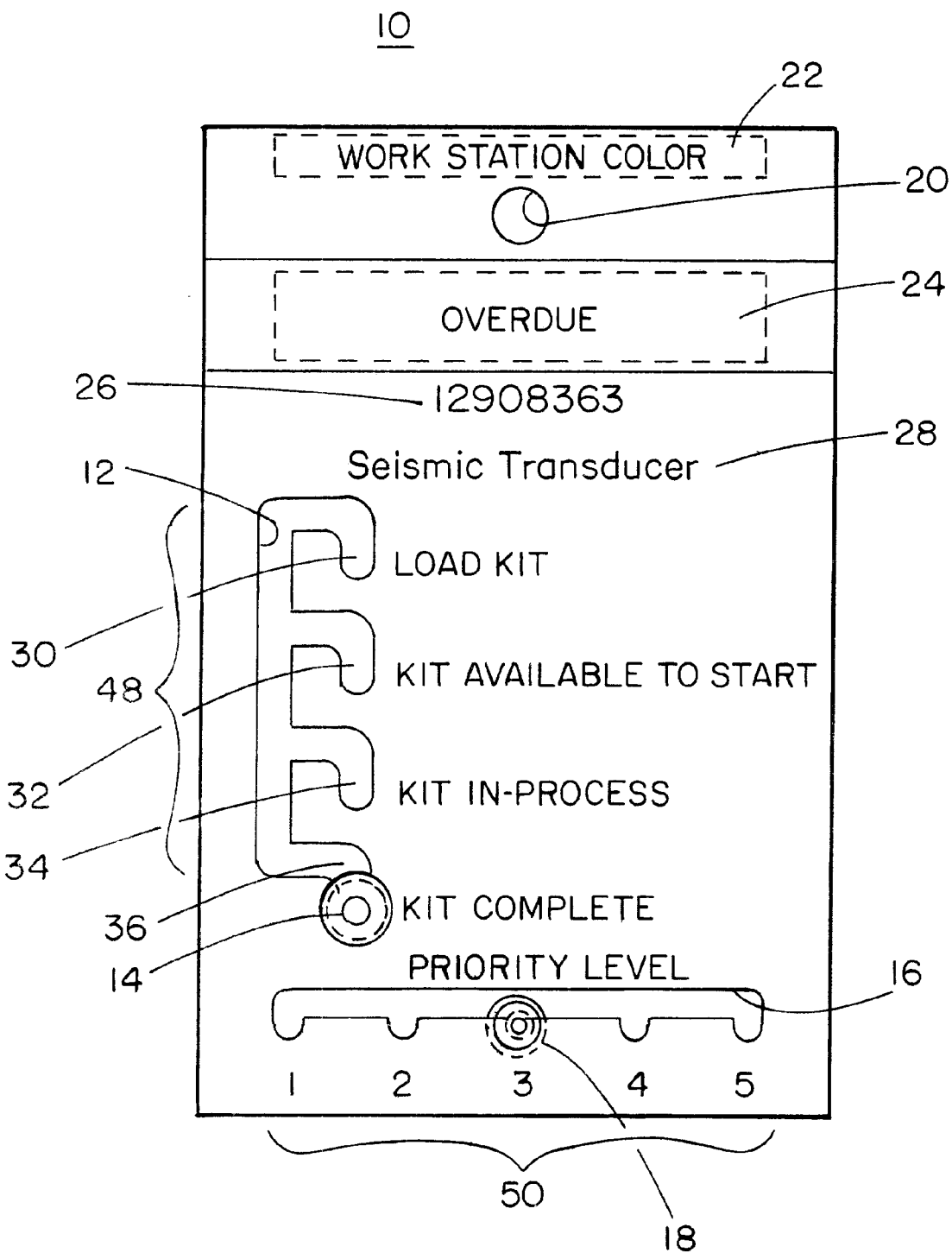

In a preferred embodiment, cue card 10, illustrated in more detail in FIG. 2, comprises a relatively thin white plastic material. Cue card 10 includes a workstation visual cue 22, which can comprise a color-coded identification corresponding to visual cue indicator 46, which identifies a particular workstation where the kit should be located on the shop floor. Cue card 10 further comprises a work indicator 24 which may include a colored identification, for example, green, which indicates that the kit is ready to start being assembled. As particularly illustrated in FIG. 3, a template overlay 25 can be positioned over cue card 10 to indicate a status of a particular kit. For example, overlay 25 can include a transparent member (e.g., plexiglass) with red lettering "OVERDUE" thereon. Overlay 25 also includes a notch for hanging on hook 44. Thus, when a particular kit is overdue, the operator positions the overlay 25 over cue card 10. Because overlay 25 is transparent, work indicator 24 and workstation visual cue 22 are still visible.

Cue card 10 further includes a number indicator 26 which indicates the assembly or part number of the particular part or sub-assembly in a kit. Cue card 10 further includes a part/sub-assembly indicator 28 which gives a brief written description of the part or sub-assembly of the corresponding kit. Cue card 10 further includes a status indicator 48 which indicates the status of a particular kit on the shop floor. Status indicator 48 includes a groove or slot 12, having notches 30–36 therein which correspond to the particular status of the corresponding kit. A movable pin 14 is further provided which is guided by slot 12 and is movable between notches 30–36 for indicating the status of the kit.

When the pin 14 is positioned in notch 30, this indicates to the shop floor worker to load the predetermined parts into the kit. When pin 14 is positioned in notch 32, this indicates that the parts are in the kit and that the assembler can begin assembling the parts. When pin 14 is positioned in notch 34, this represents that the kit is in process, which is to say that the parts in the kit are being assembled. When pin 14 is positioned in notch 36, this indicates that the kit is complete, which is to say the sub-assembly is fully assembled or the product is finally assembled, and the product is now ready for testing and final inspection.

Cue card 10 further includes a priority level indicator 50 which indicates to the assembler or tester the urgency of the corresponding kit. Accordingly, a second slot or groove 16 is provided in cue card 10, which guidably supports a second movable pin 18. Pin 18 is movable among the priority levels 1 through 5, with 1 indicating a high-priority level or extremely urgent, and 5 representing a lower urgency level. Cue card 10 includes an aperture 20 therethrough for receiving hook 44. Other suitable fastening means, for example, Velcro™ can be used to fasten cue card 10 to display device 40 without departing from the scope of the present invention.

Figure 4:
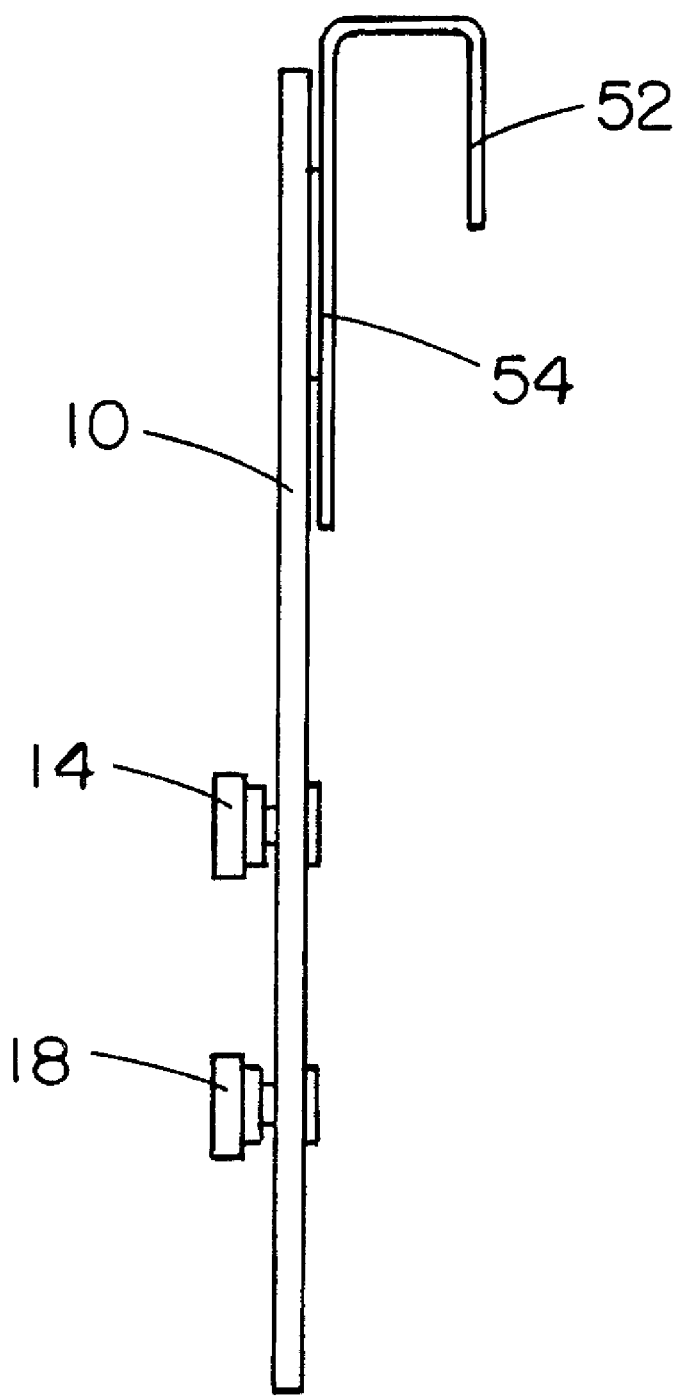
FIG. 4 illustrates the cue card of FIG. 1 ready for mounting onto a kit.

The operation of the present invention will now be described. First, the system controller, also referred to as a supervisor, schedules for an upcoming predetermined amount of time, for example, a week or month, the workload requirement in priority for the output of a product. The supervisor selects the appropriate number of cue cards 10 and places them onto the display device 40 and adjusts the movable pin 14 to the load kit notch 30. The supervisor further adjusts pin 18 to the desired priority level. In a preferred embodiment of the present invention, a second cue card 10 is removably fastened to the kit itself, such that a duplicate cue card is available to the assembler or tester at the workstation. This allows the assembler or tester who is sitting at his or her appropriate workstation to quickly verify the information on cue card 10. As shown in FIG. 4, cue card 10 can be removably attached to the kit by means of an L-shaped bracket 52 which removably hangs on the side of the kit. The cue card 10 can be removably fastened to bracket 52 by Velcro™ 54 or other suitable means. Alternatively, a single cue card can be displayed on display device 40 corresponding to a particular kit.

When the parts have been loaded into the respective kits, pin 14 is moved into notch 32 indicating that the assembler can begin assembling the parts in the kit when the kit is moved to the appropriate workstation. The assemblers then select a kit to start working on, based on the priority level indicator. Upon beginning the assembly of the parts, the assembler moves pin 14 to notch 34, indicating that the kit is being assembled. In a preferred embodiment of the present invention, pin 14 remains in notch 34 throughout the assembly, test, and inspection process.

Upon completion of all the assembly and test stages, the kit is moved to a final inspection workstation where the product and any corresponding documentation is reviewed and otherwise finalized. When all these requirements have been met, the system operator moves pin 14 to notch 36, which indicates that the kit is complete, and places the completed kit at a predetermined location. The cue card 10 may be removed and re-used with another kit.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for monitoring the assembly, inspection, and testing of a product, comprising:

a plurality of kits, each kit containing a plurality of parts to be assembled together to form a product;

a plurality of cue cards, each card having a status indicator corresponding to the assembly progress of a particular kit; and a display device that visually displays the cue cards, the cue cards being attachable to the display device.

2. The apparatus of claim 1, wherein the status indicator indicates to load the parts into the kits.

3. The apparatus of claim 1, wherein the status indicator indicates that the parts in the kit are ready to be assembled.

4. The apparatus of claim 1, wherein the status indicator indicates that the parts in the kit are being assembled.

5. The apparatus of claim 1, wherein the status indicator indicates that the parts in the kit are assembled.

6. The apparatus of claim 1, wherein each cue card further includes a priority level indicator corresponding to the priority level of a particular kit.

7. The apparatus of claim 6, wherein the priority level corresponds to a number from 1 through 5.

8. The apparatus of claim 1, wherein the cue card further includes a visual work indicator.

9. The apparatus of claim 8, wherein the work indicator indicates that the kit is overdue.

10. The apparatus of claim 8, wherein the work indicator indicates that the kit is ready to begin assembly.

11. The apparatus of claim 1, wherein the cue card further comprises a piece part and an assembly number.

12. The apparatus of claim 1, wherein the cue card further comprises a description of a piece part and an assembly.

13. The apparatus of claim 1, wherein the display device includes a holding mechanism that removably fastens the cue card to the display device.

14. The apparatus of claim 1, further comprising a plurality of work stations for assembling a subassembly of the product and testing and inspecting the product.

15. The apparatus of claim 14, wherein the cue card further includes a particular visual work station indicator where the kit should be located.

16. The apparatus of claim 14, wherein the display device further includes a work station indicator for each workstation.

17. The apparatus of claim 15, wherein the work station indicators are aligned in rows on the display device.

18. The apparatus of claim 1, wherein the status indicator indicates to load the parts into the kits, the parts in the kit are ready to be assembled, the parts in the kit as being assembled, and the parts in the kit are assembled, further comprising a movable indicator that moves between the status indications.

19. The apparatus of claim 1, wherein a cue card corresponding to a cue card on the display device is attached to the kit.

20. A method of monitoring the assembly, inspection, and testing of a product, comprising the steps of:
providing a plurality of kits, each kit containing a plurality of parts to be assembled together to form a product;
providing a plurality of cue cards, each card having a status indicator corresponding to the assembly of a particular kit; and
displaying the cue cards on a display device, the cue cards being attachable thereto.

21. The method of claim 20, further comprising the step of indicating, with the status indicator, that the kits need to be loaded with the parts.

22. The method of claim 20, further comprising the step of indicating, with the status indicator, that the parts in the kit are ready to be assembled.

23. The method of claim 20, further comprising the step of indicating, with the status indicator, that the parts in the kit are being assembled.

24. The method of claim 20, further comprising the step of indicating, with the status indicator, that the parts in the kit are assembled.

25. The method of claim 20, further comprising the step of indicating a priority level corresponding to the priority level of a particular kit.

26. The method of claim 20, further comprising the step of visually indicating that the kit is overdue.

27. The method of claim 20, further comprising the step of visually indicating that the kit is ready to begin assembly.

28. The method of claim 20, further comprising the step of visually displaying a piece part and an assembly number.

29. The method of claim 20, further comprising the step of visually displaying a description of a piece part and an assembly.

30. The method of claim 20, further comprising the step of assigning each kit to a particular work station for assembling a subassembly of the product and testing and inspecting the product.

31. The method of claim 30, further comprising the step of visually displaying on the cue card and display device a particular work station.

32. The method of claim 20, further comprising the step of displaying a cue card corresponding to a cue card on the display device on the kit.

33. An apparatus for monitoring the assembly, testing, and inspection of a plurality parts located in a plurality of kits to form a product, comprising:
a plurality of cue cards, each card having a status indicator and a priority level corresponding to a the status and priority level of a particular kit; and
a visual display device that displays the cue cards, which are attachable thereto.

34. The apparatus of claim 33, further comprising a plurality of work stations for assembling and testing the products.

35. The apparatus of claim 33, wherein the cue cards are positioned on the visual display device in visually identifiable areas corresponding to particular work stations.

36. The apparatus of claim 33, wherein the status indicator includes a pin guidably positioned within a slot of the cue card.

37. The apparatus of claim 36, wherein the pin is positionable within five different positions, with the first position indicating a high priority level and the fifth position indicating a low priority level.

* * * * *